Nov. 8, 1949     H. F. FISCUS     2,487,536
DESK ATTACHMENT FOR AUTOMOBILE STEERING WHEELS
Filed Dec. 29, 1948
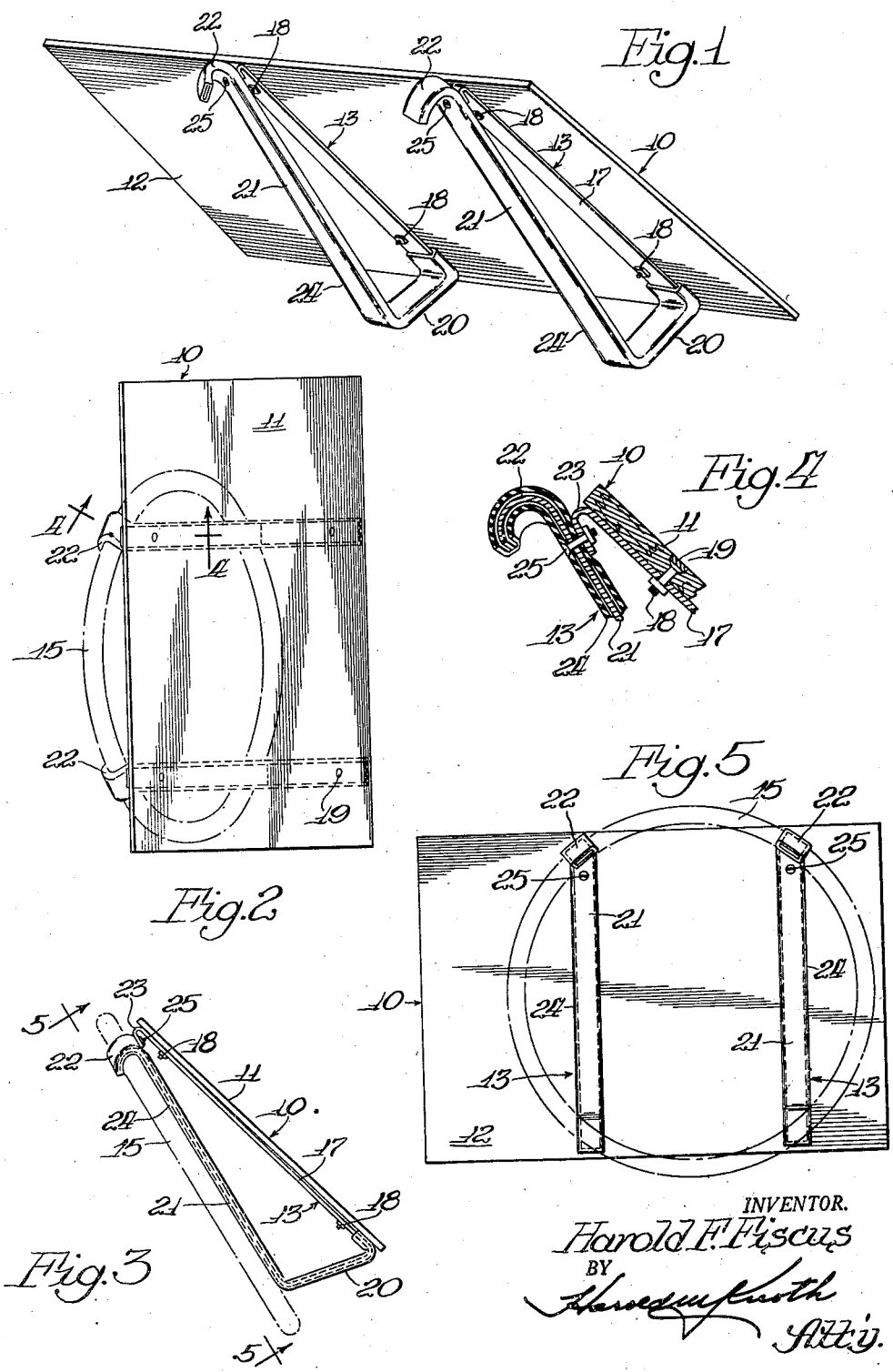
INVENTOR.
Harold F. Fiscus
BY Patented Nov. 8, 1949

2,487,536

UNITED STATES PATENT OFFICE 2,487,536

DESK ATTACHMENT FOR AUTOMOBILE STEERING WHEELS

Harold F. Fiscus, Eddyville, Iowa

Application December 29, 1948, Serial No. 67,862

3 Claims. (Cl. 311—21)

This invention relates to a desk that may be easily and readily attached to and removed from the steering wheel of an automobile, truck or like vehicle.

The invention finds its greatest use as a temporary expedient to facilitate the making of notes, sketches and the like by those who do a great deal of driving in connection with their work. The invention contemplates and has for a principal object the provision of an improved desk comprising a flat smooth-surfaced element in the form of a board or its equivalent which includes on its under side a pair of supporting members adapted for engagement with the rim of the steering wheel of a vehicle. It is an important object of the invention to provide each support with attachment means, preferably in the form of a pair of hooked elements disposed in transversely spaced apart relationship and adapted to hook over an upper or forward portion of the wheel rim, other portions of the supports extending longitudinally and rearwardly and adapted simply to rest on other portions of the wheel rim. This feature of the invention contributes materially to the ease with which the desk may be mounted on or removed from the steering wheel and the general structure of the desk is such that it may be easily handled by the user with one hand. Another feature of the invention is the angular relationship of the hooked elements which are disposed generally on radii of a circle substantially coincident with the average sized steering wheel, thus providing means for preventing the desk from slipping angularly about the wheel rim. A still further feature of the invention resides in the provision of the supports in such form that the angle of inclination of the surface of the desk to the horizontal is substantially less than the angle of inclination of the steering wheel, the surface of the desk being thus disposed at a more convenient angle.

The invention contemplates also the provision of rubber or equivalent material for covering the supports to prevent marring of the wheel and further to eliminate displacement of the desk with respect to the wheel. It is contemplated that the user of the desk may carry it behind his seat in the vehicle and may readily reach back with one hand and hook it onto the steering wheel whenever its use is required.

The foregoing and other important objects and desirable features inherent in and encompassed by the invention will be brought out in detail in the following description of a preferred embodiment of the invention as illustrated in the accompanying sheet of drawings in which:

Fig. 1 is a perspective view of the desk in its entirety;

Fig. 2 is a plan view of the desk illustrating the mounting thereof on a steering wheel;

Fig. 3 is a side view of the structure shown in Fig. 2;

Fig. 4 is an enlarged fragmentary sectional view taken substantially along the line 4—4 of Fig. 2; and Fig. 5 is a view from the under side of the desk as seen generally along the line 5—5 of Fig. 3.

The desk comprises an element in the form of a board 10 having an upper smooth surface or face 11. The board may be of plywood, plastic or other suitable material, the selection of which is left to individual desires. The board element is substantially rectangular as viewed from above and, since it is of uniform thickness, it will have a substantially flat under surface 12 which provides under surface portions for the mounting of supporting means including a pair of supports, each indicated in its entirety by the numeral 13.

The supports 13 adapt the desk 10 for mounting on the steering wheel of an automobile, truck or like vehicle. For the purposes of the present illustration, a passenger automobile steering wheel of average size and disposition has been selected. Such a steering wheel is illustrated in Figures 2, 3 and 5 as having a circular rim 15 which may have an outside diameter of approximately eighteen inches. The plane of the rim is illustrated as being disposed at an angle of 60° to the horizontal.

In the following portion of the description, and in the claims, reference to the parts as having front and rear portions or upper and lower portions, and as extending in particular directions, is made with respect to the longitudinal extent of the vehicle in which the steering wheel 15 is mounted. It will be obvious, of course, that in many vehicles, such as maintenance and excavating equipment, in which the desk may be used as well as in passenger cars and trucks, the particular disposition of the desk on the steering wheel may vary with respect to the length of such vehicle. These possibilities should, therefore, be kept in mind and the specific description and illustration herein should not be taken as importing any limitations into the nature and application of the invention.

Since the supports 13 are identical, it will be necessary to describe only one. The supports are spaced apart transversely a distance less than the diameter of the steering wheel rim 15 and they extend longitudinally of the desk element 10 and in parallelism. Each support is preferably in the form of a single member of strap iron or the like having a first longitudinal portion 17 extending lengthwise of and mounted on the under surface 12 at one side of the element 10. The means for securing the portion 17 to the element 10 may take any form and is illustrated here as comprising a pair of bolts 18, each of which may have its head recessed as at 19 (Figure 4). The recesses for accommodating the bolt heads may be filled with putty, wood filler or other suitable subtance, whereby the upper surface 11 is kept smooth and uninterrupted.

The portion 17 starts at a forward edge portion of the board 10 and runs to substantially the rear edge portion, at which point it is bent or directed downwardly at an acute angle to provide a downwardly extending portion 20. This portion extends for a short distance and is integral with or otherwise joined to a second longitudinally extending portion 21. This latter portion extends forwardly to a point substantially in alinement with the front edge portion of the board 10 and is bent or directed angularly outwardly and curved downwardly and backwardly to provide a hooked part 22 (Figure 4). The forward part of the first longitudinally extending portion 17 is bent downwardly and backwardly as at 23 to provide means for connection to the front hooked part 22 of the longitudinal portion 21.

In the form of the invention illustrated, the portions 20, 21 and 22 of each member 13 are covered by resilient or cushioning material here shown as comprising a length of suitable rubber tubing 24, which thus provides a protective covering and also non-skid surfaces on those portions of the support that engage the steering wheel rim 15.

As best shown in Figure 5, the angular disposition of each hook portion 22 is such that it lies generally on a radius of the steering wheel rim 15. Figure 4 shows the connection of the forward part of the support portion 21 to the forward part 23 of the supporting portion 17. Preferably, the covered element 24 and the portions 21 and 23 are apertured to receive a bolt 25. Inasmuch as various components of the supports 13 are enclosed within the rubber covering element or tubing 24, designation of these parts will be by reference characters with full lead lines, just as if the inner parts were exposed.

The mounting of the desk on the steering wheel rim 15 is best shown in one of its aspects in Figures 2 and 5, from which it will be clear that the transversely spaced apart hooked portions 22 engage or hook over a forward or upper portion of the wheel rim and are transversely alined on a chord across this portion of the rim. Figure 3 shows that the lower portion of each support 13 engages a lower or rearward portion of the wheel rim 15. The length of each support 13 and the transverse spacing thereof insures that the desk will fit several steering wheel rims through a wide range of diameters.

As best shown in Figures 1 and 3, each support 13 is generally triangular as viewed from the side and the long side of the triangle is the support portion 17. Inasmuch as the next longest side 21 of the triangle rests on the top of the rim 15, the angle of inclination of the surface 11 to the horizontal will be substantially less than the angle of inclination of the plane of the wheel rim. The surface 11 is thus disposed at an inclination that is found to be substantially the most convenient for writing, sketching, etc.

In order that the upper surface 11 may have a maximum area consistent with other requirements, the transversely spaced apart supports 13 are offset laterally to one side of the element 10. In the present case, the offset is laterally to the driver's left, thus leaving an overhanging portion of the element 10 at the driver's right. The engagement of the hooked portions or elements 22 with the rim 15, and the non-skid engagement of the supports 13 with the rim provide for a secure mounting of the desk on the wheel rim and there is no likelihood that the desk can be accidentally displaced from the wheel rim except in a forward direction, which is also the direction of movement for deliberate removal. Various other features of the invention not specifically enumerated above will undoubtedly occur to those skilled in the art, as likewise will various modifications and alterations of the preferred form of the invention illustrated, all of which may be achieved without departing from the spirit and scope of the invention as defined in the appended claims.

What is claimed is:

1. For use in an automobile vehicle having a steering wheel provided with a rim the plane of which is inclined to the horizontal downwardly and rearwardly of the vehicle: an attachment for such steering wheel, comprising a desk element having a relatively broad, generally flat upper surface, front and rear edge portions, and undersurface portions generally parallel to the upper surface from front to rear of the element; means for sustaining the element on and above the steering wheel including a pair of supports spaced apart transversely a required distance less than the diameter of the steering wheel rim and running lengthwise of the element, each support including a single member having a first longitudinal portion extending along one of the undersurface portions of the element from a front end substantially at and secured to the front edge of the element to substantially the rear edge of the element, thence extending downwardly, and thence extending as a second longitudinal portion forwardly and upwardly back to substantially the front edge of the element at an angle to the first portion and secured to the element, each support being thereby of triangular shape as viewed from the side and said second portions adapted to rest on the rim of the steering wheel to dispose the upper surface of the element at an angle of inclination to the horizontal substantially less than that of the steering wheel plane, and one of the longitudinal portions of each support being extended forwardly and then downwardly in the form of a hook adapted to engage over a forward rim portion of the wheel to hold said element in place against downward and rearward displacement relative to the steering wheel.

2. For use in an automobile vehicle having a steering wheel provided with a rim the plane of which is inclined to the horizontal downwardly and rearwardly of the vehicle: an attachment for such steering wheel, comprising a desk element having a relatively broad, generally flat upper surface, front and rear edge portions, and undersurface portions generally parallel to the upper surface from front to rear of the element; means for sustaining the element on and above the steering wheel including a pair of supports spaced apart transversely a required distance less than the diameter of the steering wheel rim and running lengthwise of the element, each support including a single member having a longitudinal portion disposed below the element and at a downward and rearward angle to the upper surface of the element and extending from a front end substantially at and secured to the front edge portion of the element to a rear portion spaced below the rear edge portion of the element, and thence extending upwardly to and secured to said rear edge portion, said longitudinal portions being adapted to rest on the rim of the steering wheel to dispose the upper surface of the element at an angle of inclination to the horizontal substantially less than that of the steering wheel plane; and means for releasably securing the supports to front portions of the steering wheel rim spaced transversely on a chord of said rim, including hooked extensions respectively on the longitudinal portions of the supports.

3. For use in an automobile vehicle having a steering wheel provided with a rim the plane of which is inclined to the horizontal downwardly and rearwardly of the vehicle: an attachment for such steering wheel, comprising a desk element having a relatively broad, generally flat upper surface and front and rear edge portions, said upper surface having a transverse extent substantially greater than the diameter of the steering wheel rim; means for sustaining the element on and above the steering wheel, including a pair of supports secured to the element and extending lengthwise thereof below said upper surface and in transversely spaced apart relation, each support including a continuous longitudinal portion extending downwardly and rearwardly at a substantial angle to the upper surface of the element, and said portions being spaced apart transversely a required distance less than the diameter of the steering wheel rim and being of such length as to rest on front and rear rim portions, the aforesaid angle of said longitudinal portions with respect to the upper surface of the element serving to dispose the upper surface of the element at an angle of inclination to the horizontal substantially less than that of the steering wheel plane; means for releasably securing the element to the rim; and said longitudinal supporting portions being transversely offset to one side of the element so that the element, when mounted on the steering wheel rim, may overhang at its opposite side.

HAROLD F. FISCUS.

REFERENCES CITED

The following references are of record in the file of this patent:

UNITED STATES PATENTS

| Number | Name | Date |
|---|---|---|
| 248,014 | Beardman | Oct. 11, 1881 |
| 1,285,158 | Haynes | Nov. 19, 1918 |
| 1,344,498 | Fox | June 22, 1920 |
| 1,717,433 | Bragg et al. | June 18, 1929 |
| 1,883,714 | Gray | Oct. 18, 1932 |
| 1,900,325 | Bayman et al. | Mar. 7, 1933 |
| 1,977,507 | Edwards | Oct. 16, 1934 |
| 1,991,029 | Pinney | Feb. 12, 1935 |